United States Patent
Jones

(10) Patent No.: US 6,941,760 B1
(45) Date of Patent: Sep. 13, 2005

(54) START SYSTEM FOR EXPENDABLE GAS TURBINE ENGINE

(75) Inventor: Anthony Jones, San Diego, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 40 days.

(21) Appl. No.: 10/392,223

(22) Filed: Mar. 19, 2003

(51) Int. Cl.$^7$ .......................................... F02C 7/268
(52) U.S. Cl. ..................... 60/778; 60/787; 60/727
(58) Field of Search .................... 60/772, 727, 778, 60/787

(56) References Cited

U.S. PATENT DOCUMENTS

| | | | |
|---|---|---|---|
| 2,643,511 A | 6/1953 | Briggs | |
| 2,754,657 A * | 7/1956 | Ehorn | 60/787 |
| 2,941,790 A * | 9/1960 | Compton et al. | 60/787 |
| 3,704,586 A * | 12/1972 | Bruns | 60/787 |
| 3,886,733 A | 6/1975 | Connell | |
| 4,161,102 A | 7/1979 | Jasas et al. | |
| 4,249,371 A * | 2/1981 | Romeyke | 60/774 |
| 4,686,822 A * | 8/1987 | Frutschi | 60/772 |
| 4,815,277 A | 3/1989 | Vershure, Jr. et al. | |
| 4,899,536 A | 2/1990 | Vershure | |
| 4,938,021 A * | 7/1990 | Jones et al. | 60/788 |
| 5,123,239 A | 6/1992 | Rodgers | |
| 5,131,223 A | 7/1992 | Owen | |
| 5,209,056 A * | 5/1993 | Shekleton et al. | 60/778 |
| 5,218,822 A * | 6/1993 | Legg | 60/611 |
| 5,231,822 A | 8/1993 | Shekleton | |
| 5,343,690 A | 9/1994 | Shekleton et al. | |
| 5,428,275 A | 6/1995 | Carr et al. | |
| 5,927,066 A | 7/1999 | Shekleton et al. | |
| 6,035,626 A | 3/2000 | Wahl et al. | |
| 6,374,592 B1 | 4/2002 | Box et al. | |
| 6,644,033 B2 * | 11/2003 | Daggett | 60/787 |

FOREIGN PATENT DOCUMENTS

WO    WO 91/01440    2/1991

* cited by examiner

*Primary Examiner*—Ted Kim
(74) *Attorney, Agent, or Firm*—Carlson, Gaskey & Olds

(57) ABSTRACT

A start system for an expendable gas turbine engine includes a pressurized oxygen source and a pyroflare igniter. The pressure source communicates oxygen to a compressor through a first passage to spin-up a rotor and communicates oxygen to a combustor through a second passage to provide light-off oxygen for the atomized fuel within the combustor. A pressure regulator shuts off the impingement flow at a predetermined pressure and blow down of combustor flow continues for an enhancement period to assure continued operation of the gas turbine even at high altitudes.

17 Claims, 5 Drawing Sheets

START SYSTEM FOR EXPENDABLE GAS TURBINE ENGINE

BACKGROUND OF THE INVENTION

The present invention relates to an expendable gas turbine engine, and more particularly to a start system utilizing a relatively large high pressure oxygen source.

Miniature turbojet engines are often utilized in single usage applications such as reconnaissance drones, cruise missiles, decoy and other weapon applications including air-launched and ground-launched weapon systems. The use of such an engine greatly extends the range of the weapon in comparison to the more conventional solid fuel rocket engine. Miniature gas turbine engines are difficult to fabricate sufficiently economically for general expendable usage in large numbers.

To achieve economically feasible extended range expendable propulsion sources for such weapon systems, it is necessary that not only the gas turbine engines themselves be manufactured relatively inexpensively, but that their peripheral systems must likewise be manufactured relatively inexpensively. Notwithstanding the concern for inexpensive systems, a high degree of reliability is still paramount.

Peripheral systems employed for starting an expendable gas turbine engine are of particular concern as the failure to reliably start the gas turbine engine results in a failure of entire weapons system. Moreover, many weapon systems with gas turbine engines are commonly air launched from an airborne launch platform at a relatively high altitude. High altitude starting of a miniature gas turbine engine may be particularly difficult to achieve due to difficulties with combustor light-off.

Traditional start systems for expendable gas turbine engines consist of pyrotechnic gas generators and pyroflare igniters. At high altitudes, oxygen injection is often provided to enhance combustor light-off reliability and combustor stability during the rapid engine acceleration produced by the pyrotechnic gas generator. In a start sequence for a traditional gas turbine engine, the pyrotechnic gas generator is ignited to spin up the engine by impinging upon the turbine or compressor. The pyroflare igniter provides a source for fuel light-off within the combustor. Although highly effective and reliable, traditional start systems are a relatively expensive peripheral system utilized in an expendable role.

Accordingly, it is desirable to provide a highly reliable, inexpensive starting system for an expendable gas turbine engine.

SUMMARY OF THE INVENTION

The start system according to the present invention provides a pressure source and a pyroflare igniter for an expendable gas turbine engine. The pressure source includes an oxygen bottle pressurized to a high pressure. The pressure source communicates with a compressor through a first passage to spin-up the rotor shaft and with a combustor through a second passage. The second passage communicates with the combustor at a point adjacent to at least one fuel injector. The pyroflare igniter communicates with the combustor to provide a light-off source for atomized fuel from the fuel injectors.

The start system is initiated by opening a pyro-actuated valve such that pressurized oxygen is released into the first and second passage. The oxygen flow within the first passage is regulated to approximately 500 psig to spin-up the rotor shaft through impingement on the compressor blades. During impingement flow, the second passage concurrently communicates combustor flow to the combustor to maintain ignition even at relatively high altitudes where the combustor may otherwise be oxygen starved.

Within the impingement period of approximately 5 seconds light-off of the engine occurs. A pressure regulator shuts off impingement flow and blow down combustor flow of the pressure source continues to the combustor for an enhancement period of approximately 10 seconds. The enhancement period assures that combustor flow continues to the combustor to further assist in a steady run-up of engine RPM to assure reliable operation of the engine during high altitude launch.

The present invention therefore provides a highly reliable, inexpensive starting system for an expendable gas turbine engine.

BRIEF DESCRIPTION OF THE DRAWINGS

The various features and advantages of this invention will become apparent to those skilled in the art from the following detailed description of the currently preferred-embodiment. The drawings that accompany the detailed description can be briefly described as follows.

DETAILED DESCRIPTION OF THE PREFERRED EMBODIMENT

Figure 1:
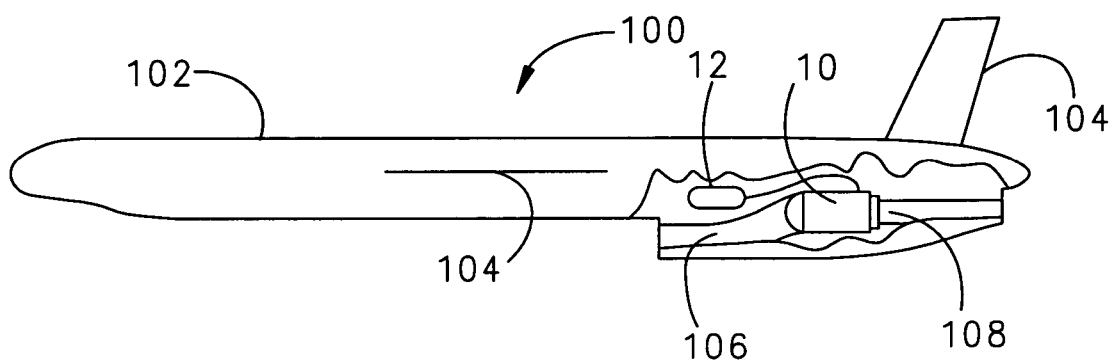
FIG. 1 is a general perspective view an exemplary embodiment for use with the present invention.

FIG. 1 illustrates a general schematic view of a vehicle 100 including an expendable miniature gas turbine engine 10 having a start system 12 according to the present invention. The vehicle 100 includes a body 102 and one or more aerodynamic surfaces 104. The engine 10 is coupled to, or within, the body 102. An intake 106 provides air to the engine 10, and an exhaust pipe 108 exhausts the thrust therefrom. The engine 10 of the invention may also be used in other single usage and reusable applications such as reconnaissance drones, cruise missiles, decoys and other weapon and non-weapon applications. The start system 12 is particularly applicable to air-launch applications.

Figure 2:
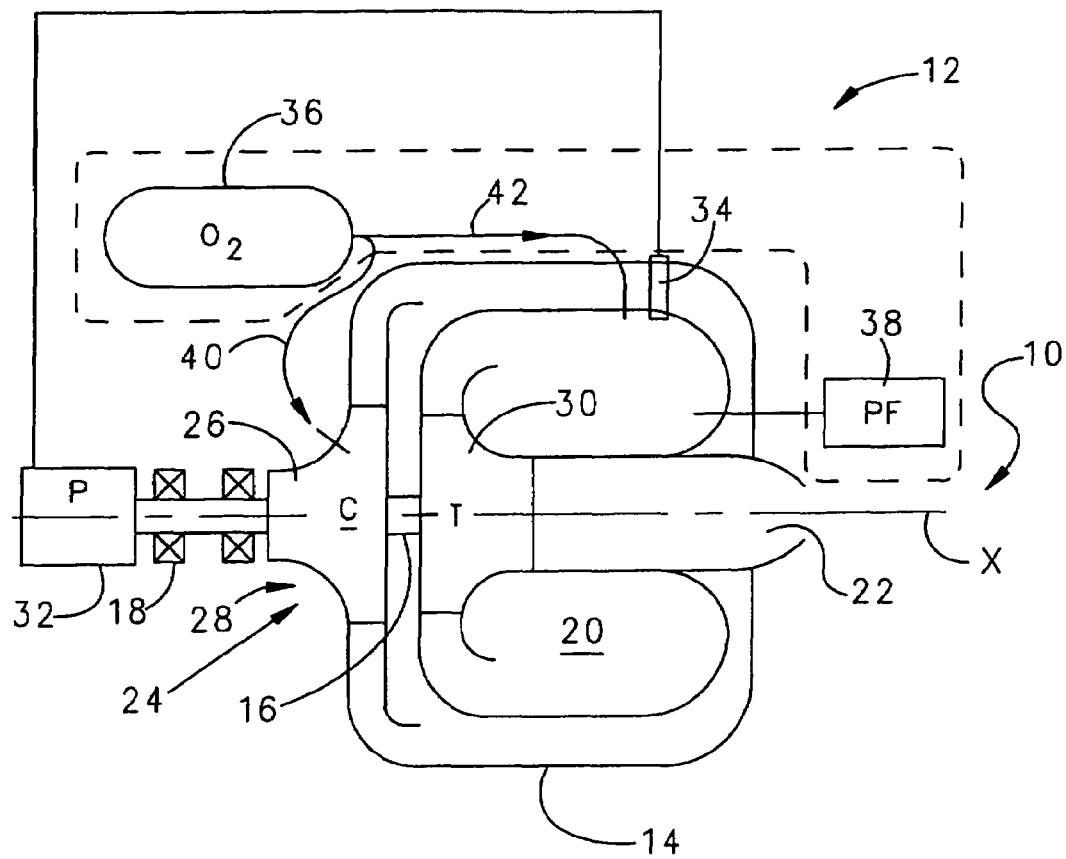
FIG. 2 is a schematic view of a gas turbine engine having a start system according to the present invention.

Referring to FIG. 2, the miniature gas turbine engine 10 generally includes a housing 14, a rotor shaft 16 rotationally mounted to a forward bearing 18, a combustion chamber 20 and an exhaust pipe (nozzle) 22. The rotor shaft 16 rotates about a longitudinal axis X and preferably provides a monorotor configuration although other forms of rotors would benefit from the present invention. In the illustrated monorotor configuration, a rotor 24 includes compressor blades 26 facing forward toward an inlet 28 while the opposite side of the rotor 24 includes turbine blades 30 to define a turbine wheel. The forwardly extending shaft 16 is received in the bearings 18 and is preferably coupled to a fuel pump (illustrated schematically at 32) to provide fuel to the annular combustor 20 through fuel injectors (illustrated schematically at 34).

The start system 12 includes a pressure source 36 which contains an oxygenated gas and a pyroflare igniter 38. The pressure source 36 is preferably an oxygen bottle pressurized to 5000–7000 psig. It should be understood that other pressurization levels for other applications and altitudes will also benefit from the present invention. Generally, however, the pressurization and flow rate of oxygen from the present invention is much greater than conventional start systems which provide only relatively low oxygen flow at a low pressure to assist in combustor operation.

The pressure source 36 may be remotely located from the engine 10 or integrated therewith. The pressure source 36 communicates with the compressor blades 26 through a first passage 40 to spin-up the rotor 2A. The pressure source 36 also communicates with the combustor 20 through a second passage 42. Preferably, the second passage 42 communicates with the combustor 20 at a point adjacent to at least one fuel injector 34. The pyroflare igniter 38 communicates with the combustor 20 to provide a light-off ignition source for atomized fuel from the fuel injectors 34. It should be understood that although only a single injector 34 and second passage 42 are disclosed in the illustrated embodiment, multiple inputs will also benefit from the present invention.

Figure 3:
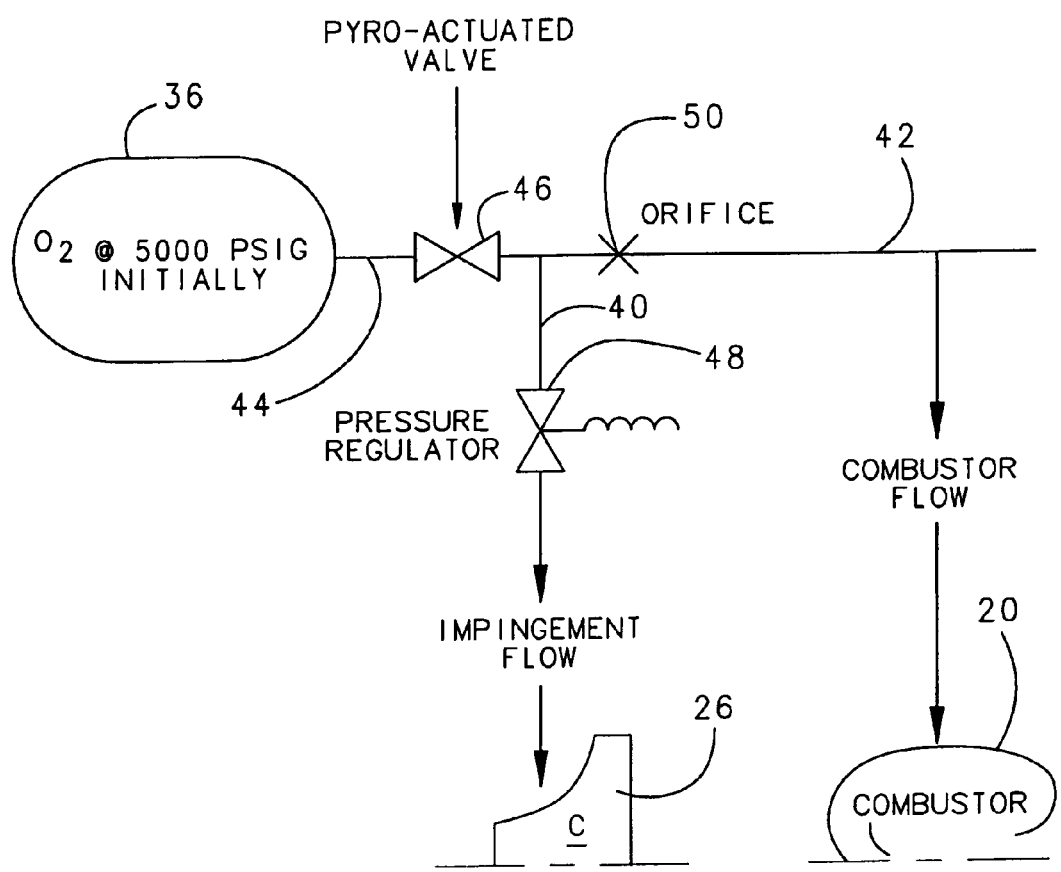
FIG. 3 is a schematic view of the start system of FIG. 2.

Referring to FIG. 3, the first passage 40 provides an impingement flow and the second passage 42 provides a combustor flow. A main passage 44 communicates with pressure source 36 and the first and second passage 40, 42. A single use valve such as a pyro-actuated valve 46 is preferably located in the main passage 44.

A pressure regulator 48 is located in the first passage 40 and a flow restrictor orifice 50 is located within the second passage 42. It should be understood that although disclosed as separate components in the illustrated embodiment, the pyro-actuated valve 46, the pressure regulator 48 and the flow restrictor orifice 50 may be integrated into a single component.

Figure 4:
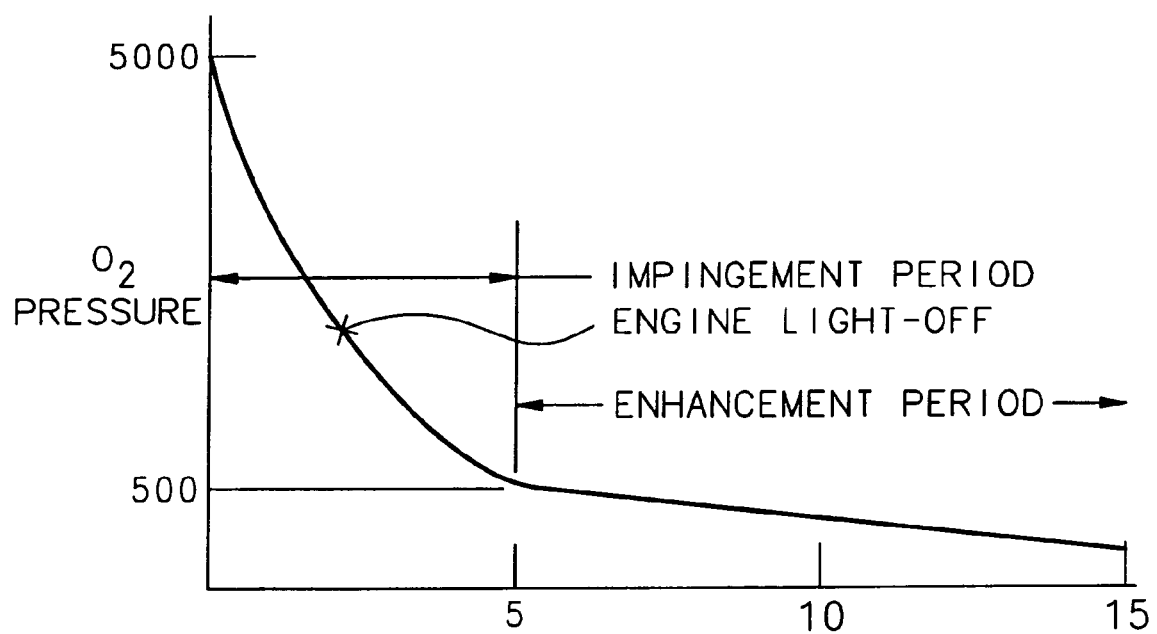
FIG. 4 is a graphical representation of a pressure blow down of a pressure source utilized to start the gas turbine engine.

The start system 12 is initiated by opening the pyro-actuated valve 46. That is, by actuating the pyro-actuated valve 46 pressurized oxygen is released from the pressure source 36. The oxygen flow within the first passage 40 is regulated to preferably approximately 500 psig. The impingement flow spins-up the rotor 24 through impingement on the compressor blades 26 for an impingement period of approximately 5 seconds (FIG. 4). Impingement flow may alternatively or additionally be provided to the turbine blades 30 (FIG. 3), however, minimal combustion light-off improvement is obtained such that such an arrangement may be better suited for a relatively lower altitude start.

During impingement flow, the second passage 42 concurrently communicates combustor flow to the combustor 20. The flow restrictor orifice 50 limits oxygen flow to the combustor 20 to a consistent combustor flow to maintain ignition even at relatively high altitudes where the combustor 20 may otherwise be oxygen starved. That is, the flow restrictor orifice 50 limits combustor flow to a predetermined maximum pressure. Impingement flow and combustor flow continues until the oxygen pressure reaches the pressure regulator 48 pressure of approximately 500 psig. (FIG. 4).

Figure 5:
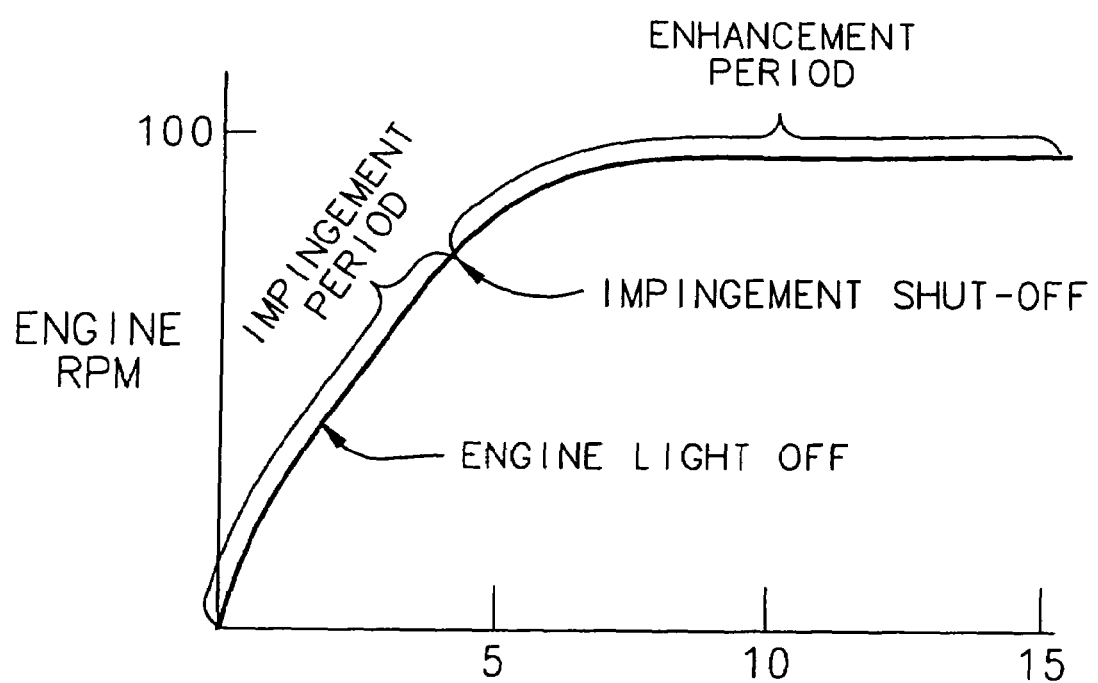
FIG. 5 is a graphical representation of a start sequence RPM ramp up during starting of the gas turbine engine with start system of the present invention.

Referring to FIG. 4, within the impingement period of approximately 5 seconds light-off of the engine 12 will occur (FIG. 5). Preferably, light-off of the engine 12 occurs at the midpoint of the impingement period to provide adequate impingement flow after light-off, assure a steady run-up of engine RPM, and a reliable start.

The pressure regulator 48 (FIG. 3) shuts off impingement flow and blow down combustor flow of the pressure source 36 continues to the combustor 20 for an enhancement period of approximately 10 seconds. It should be understood that other enhancement periods will benefit from the present invention.

The pressure regulator 48 preferably shuts off impingement flow at approximately 80% of full engine RPM (FIG. 5). That is, the volume of the pressure source 36 is preferably of a capacity which assures impingement flow to approximately 80% of full engine RPM. Other start-up RPMs for other launch profiles, e.g., ground launch, will also benefit from the present invention. The enhancement period assures that combustor flow continues to the combustor 20 to further assure reliable operation of the engine 10 during high altitude launch.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A start system for an expendable gas turbine engine comprising:
    a pressure tank which communicates an oxygenated gas through a first passage and a second passage, said first passage providing an impingement flow to a compressor and said second passage providing a combustor flow to a combustor; and
    a single-use valve upstream of said first passage and said second passage to initiate release of said oxygenated gas from said pressure tank until said pressure tank is effectively empty.

2. The start system as recited in claim 1, wherein said pressure tank comprises an oxygen bottle.

3. The start system as recited in claim 1, wherein said second passage communicates with said combustor adjacent a fuel injector.

4. The start system as recited in claim 1, further comprising a flow regulator within said first passage.

5. The start system as recited in claim 4, further comprising a flow restrictor orifice within said second passage, said flow restrictor orifice downstream of said flow regulator.

6. The start system as recited in claim 4, wherein said flow regulator within said first passage shuts off impingement flow when a pressure within said pressure tank falls below a predetermined pressure.

7. The start system as recited in claim 1, wherein said single use valve includes a pyro-actuated valve upstream of said first and second passage.

8. A method of starting an expendable gas turbine engine comprising the steps of:
    (1) communicating an impingement flow to a compressor from a pressure tank;
    (2) communicating a combustor flow to a combustor from the pressure tank; and
    (3) activating a single use valve to initiate communicating of the impingement flow of said step (1) and the combustor flow of said step (2) until the pressure tank is effectively empty.

9. A method as recited in claim 8, wherein said step (1) further comprises the steps of:
   maintaining the impingement flow of said step (1) until a predetermined pressure is reached; and
   cutting off the impingement flow of said step (1) below the predetermined pressure.

10. A method as recited in claim 9, wherein said step (2) further comprises the step of:
    maintaining the combustor flow below the predetermined pressure until the pressure tank is effectively empty.

11. A method as recited in claim 9, wherein said step (2) further comprises the step of:
    maintaining the combustor flow until the pressure source is depleted.

12. A method as recited in claim 9, wherein said step (2) further comprises the step of:
    maintaining the combustor flow below a predetermined maximum pressure.

13. A method as recited in claim 8, wherein said step (3) further comprises the step of:
    activating a pyro-actuated valve to initiate the communicating of the impingement flow of said step (1) and the combustor flow of said step (2).

14. An expendable gas turbine engine comprising:
    a compressor;
    a combustor;
    a pressure tank which communicates an oxygenated gas through a first passage and a second passage, said first passage providing an impingement flow to said compressor and said second passage providing a combustor flow to said combustor; and
    a pyro-actuated valve upstream of said first passage and said second passage to initiate release of said pressurized oxygen from said oxygen bottle until said oxygen bottle is effectively empty.

15. The expendable gas turbine engine as recited in claim 14, further comprising a pyroflare igniter in communicates with said combustor.

16. The expendable gas turbine engine as recited in claim 14, further comprising a flow regulator within said first passage which shuts off impingement flow when a pressure within said pressure tank falls below a predetermined pressure.

17. The start system as recited in claim 14, wherein said pressure tank comprises and oxygen bottle.

\* \* \* \* \*